(12) United States Patent
Kim et al.

(10) Patent No.: US 6,947,397 B2
(45) Date of Patent: Sep. 20, 2005

(54) METHOD AND APPARATUS FOR ADAPTIVE DATA TRANSMISSION IN COMMUNICATION SYSTEM

(75) Inventors: Yun Sik Kim, Seoul (KR); Wan Jong Chun, Kyunggi-do (KR)

(73) Assignee: Korea Telecommunication Authority, Kyunggi-do (KR)

( * ) Notice: Subject to any disclaimer, the term of this patent is extended or adjusted under 35 U.S.C. 154(b) by 933 days.

(21) Appl. No.: 09/747,289

(22) Filed: Dec. 21, 2000

(65) Prior Publication Data

US 2002/0080727 A1 Jun. 27, 2002

(30) Foreign Application Priority Data

Nov. 7, 2000 (KR) ........................................ 2000-65783

(51) Int. Cl.[7] .............................................. H04Q 7/00
(52) U.S. Cl. ..................................... 370/329; 370/320
(58) Field of Search ............................... 370/230, 320, 370/329, 341, 437, 443, 444, 468; 455/450, 452, 510

(56) References Cited

U.S. PATENT DOCUMENTS

| | | | |
|---|---|---|---|
| 3,983,075 A | | 9/1976 | Akutsu |
| 5,387,916 A | | 2/1995 | Cohn |
| 6,069,883 A | * | 5/2000 | Ejzak et al. ................. 370/335 |
| 6,219,343 B1 | * | 4/2001 | Honkasalo et al. .......... 370/335 |
| 6,388,999 B1 | * | 5/2002 | Gorsuch et al. ............. 370/335 |
| 6,574,211 B2 | * | 6/2003 | Padovani et al. ............ 370/347 |
| 6,700,878 B2 | * | 3/2004 | Salloum Salazar et al. . 370/329 |
| 6,704,572 B1 | * | 3/2004 | Whinnett et al. ......... 455/452.1 |

FOREIGN PATENT DOCUMENTS

| WO | 00/04728 | 1/2000 |
|---|---|---|
| WO | 00/64373 | 11/2000 |

* cited by examiner

*Primary Examiner*—Duc Ho
*Assistant Examiner*—Thien D. Tran
(74) *Attorney, Agent, or Firm*—Merchant & Gould P.C.

(57) ABSTRACT

The present invention relates to a method and apparatus for adaptive data transmission enabling data transmission in a variable transmission rate in a communication system, where a number of users share a transmission medium to transmit data in the variable transmission rate, by using a transmission capacity which is not being currently used even if allocated to some users. According to the invention, the transmission rate variation rates of each of the variable transmission rate data transmission services are controlled within the spirit of current variable transmission rate services so that the data traffic of the existing variable transmission rate transmission services which is actually unable to be forecasted can be forecasted. Therefore, the idle transmission capacity available can be forecasted so that the data can be transmitted by using the idle capacity. In this way, the transmission capacity of the system can be more efficiently used.

33 Claims, 5 Drawing Sheets

METHOD AND APPARATUS FOR ADAPTIVE DATA TRANSMISSION IN COMMUNICATION SYSTEM

BACKGROUND OF THE INVENTION

1. Field of the Invention

The present invention relates to a method and apparatus for adaptive data transmission in a communication system, and in particular to a method for enabling data transmission in a variable transmission rate by using a transmission capacity which is not being currently used even if it had been allocated to users in a communication system in which a number of users share a transmission medium to transmit data in the variable transmission rate.

2. Description of the Related Art

In general, the data traffic change, which is transmitted via a communication system, has characteristics that traffic modeling is difficult, such as, deviation is large and forecasting is impossible. Thus, in a conventional radio communication system such as CDMA(Code Division Multiple Access) system where the capacity is restricted by mutual interference, it has been literally impossible to efficiently utilize the idle capacity for data transmission even if the capacity allocated for data service has not being used when the amount of data is not known before the point of transmission.

In a wire network, the data traffic temporarily exceeding the maximum transmission capacity can be treated via buffering, or can be retransmitted without unimportant data based upon priority. However, in a communication system such as CDMA system where the capacity is restricted by mutual interference, there have been various problems such as when the actual amount of the data traffic exceeds the maximum transmission capacity allowed, all of the transmitted data in this point gets lost or the system may not be normally operated.

SUMMARY OF THE INVENTION

The invention is proposed to solve the foregoing problems and it is therefore an object of the invention to provide a method and apparatus for adaptive data transmission in a communication system where a number of users transmit data in a variable transmission rate by using a shared transmission medium, for restricting the data transmission process within the spirit of current variable transmission rate services allowing to forecast the capacity which may be used by the current variable transmission rate services so that the data having the variable transmission rate can be transmitted by using the transmission capacity which is not being used even if allocated.

To obtain the foregoing object, it is provided a method for adaptive data transmission in a communication system which has a plurality of sending communication means and receiving communication means using a shared channel and a dedicated channel, the method comprising the steps of: (a) receiving in the receiving communication means data transmitted from the plurality of sending communication means using the dedicated channel; (b) when the data are received, obtaining an idle capacity which is not being used from the maximum transmission capacity which is already allocated to the plurality of sending communication means using the dedicated channel; and (c) when the idle capacity is obtained, broadcasting shared channel information about the idle capacity to the plurality of sending communication means which use the shared channel, and later transmitting in the sending communication means the data according to the shared channel information, whereby when the plurality of sending communication means transmit the data by using the dedicated channel via variable transmission rate services, the variation rate of the transmission rates of the variable transmission rate data transmission services transmitted from the sending communication means is controlled so that the idle transmission capacity can be forecasted for use in other service data transmission.

To obtain the foregoing object, it is provided another method for adaptive data transmission in a plurality of sending communication means, in a communication system which has the sending communication means and receiving communication means using a shared channel and a dedicated channel, the method comprising the steps of: (a) calculating the average movement and the standard movement deviation of a transmission data traffic per unit time t about variable transmission rate service session to be transmitted, in response to a data transmission request of a user; (b) forecasting the traffic in the next unit time t+1 by using the calculated average movement value and the standard movement deviation value; (c) obtaining a control transmission rate guaranteeing a value between the minimum and maximum transmission rates via the calculated data traffic; and (d) transmitting data within the obtained control transmission rate; whereby when the plurality of sending communication means transmit the data via variable transmission rate services by using the dedicated channel, the variation rate of the transmission rates of variable transmission rate data transmission services is controlled so that the receiving communication means can forecast the idle transmission capacity.

To obtain one aspect the foregoing object, it is provided a further method for adaptive data transmission in receiving communication means in a communication system which has a plurality of sending communication means and receiving communication means using a shared channel and a dedicated channel, the method comprising the steps of: (a) forecasting the traffic of data received from the sending communication means using the dedicated channel; (b) obtaining a control transmission rate guaranteeing a value between the minimum and maximum transmission rates via the forecasted data traffic; (c) obtaining an idle allowable transmission rate which is not being used from the maximum capacity allowed to the plurality of sending side by using the obtained control transmission rate; and (d) when the idle capacity is obtained, broadcasting shared channel information about the idle capacity to the plurality of sending communication means which use the shared channel, and later transmitting in the sending communication means the data according to the shared channel information, whereby when the plurality of sending communication means transmit the data via the dedicated channel via variable transmission rate services, the idle transmission capacity which is not being used in the maximum capacity already allocated to the dedicated channel of the sending communication means can be forecasted for use in transmitting other service data.

To obtain the foregoing object, it is still provided another adaptive data transmission in sending communication means, in a communication system which has the sending communication means and receiving communication means using a shared channel and a dedicated channel, the method comprising the steps of: (a) receiving dedicated channel information transmitted from the receiving communication means; (b) transmitting data according to the available shared channel information in the received current unit time t in response to a data transmission request from a user; and (c) if some of the data are not transmitted at present at the result of the step (b) of transmitting data, storing the data in a transmission queue or canceling the same according to corresponding required QoS(Quality of Service), wherein the allowable transmission rate of the next unit time is received from the receiving communication system in the termination point of each unit time in the step (a), whereby the idle transmission capacity which is not being used from the maximum allocation capacity already allocated to the sending communication means using the dedicated channel can be used to transmit the data by using the shared channel information transmitted from the receiving communication means.

Also, to obtain another aspect of the foregoing object of the invention, it is provided an apparatus for adaptive data receiving in a communication system having a plurality of sending communication means and receiving communication means which use a shared channel and a dedicated channel, the apparatus comprising: a receiver module for receiving data per unit time t, the data being transmitted from one sending communication means using a variable transmission rate service via the dedicated channel and the other sending communication means using an idle capacity utilization service via the shared channel; a received traffic calculating module for calculating a traffic received during the unit time only about each of variation transmission service sessions of the data received per unit time; a data traffic forecasting module for calculating and forecasting the amount of data traffic in the next unit time based upon the value calculated in the received traffic calculation module about the each of the variable transmission rate service sessions, and obtaining a control transmission rate which guaranteeing a value between the minimum and maximum transmission rates via the calculated forecasting data traffic; a shared channel module for calculating an idle allowable transmission rate about idle capacity utilization service sessions of the unit time based upon the control transmission rate value about the services in the data traffic forecasting module; and a transmitter module for transmitting the allowable transmission rate to the sending communication means using the idle capacity utilization transmission service via the shared channel, whereby when the plurality of sending communication means transmit the data by using the dedicated channel via variable transmission rate services, the idle transmission capacity which is not being used in the maximum capacity already allocated to the dedicated channel of the sending communication means can be forecasted for use in other service data transmission.

To obtain another aspect of the foregoing object of the invention, it is provided another apparatus for adaptive data transmission in a communication system having sending communication means and receiving communication means which use a shared channel and a dedicated channel, the apparatus comprising: a receiver module for receiving shared channel information transmitted from the receiving communication means; a transmission controller module for controlling a transmission scheduler module based upon the shared channel information received from the receiving communication means; a transmission scheduler module for storing transmitting data in a transmission queue according to a data transmission request from a user, and sending the data to a transmitter module in response to a control signal from the transmission controller module; and a transmission module for modulating the data received from the transmission scheduler module, diffusing the data into a value corresponding to the pertinent shared channel subjected to transmission, and transmitting the diffused data to the receiving communication system, whereby the idle transmission capacity which is not being used from the maximum allocation capacity already allocated to the sending communication means using the dedicated channel can be used to transmit the data by using the shared channel information transmitted from the receiving communication means.

To obtain another aspect of the foregoing object of the invention, it is still provided a further apparatus for adaptive data transmission in a communication system having a plurality of sending communication means and receiving communication means which use a shared channel and a dedicated channel, the apparatus comprising: a receiver module for receiving a confirmation signal about a variable transmission rate service session setting and a QoS request; a transmission controller module for calculating the amount of a transmittable data traffic during the next unit time and forecasting the data traffic thereof based upon the amount of data transmitted during unit time, calculating a control transmission rate which guarantees a value between the minimum and maximum rates via the calculated forecasting data traffic, and then controlling data transmission from a transmission scheduler module according to the control transmission rate; a transmission scheduler module for storing transmitting data in a transmission queue according to a data transmission request from a user, and sending the data to a transmitter module in response to a control signal from the transmission controller module; and a transmitter module for modulating the data received from the transmission scheduler module and transmitting the modulated data to the receiving communication system via the corresponding dedicated channel, whereby when the plurality of sending communication means transmit the data via variable transmission rate services by using the dedicated channel, the variation rate of the transmission rates of variable transmission rate data transmission services is controlled so that the receiving communication means can forecast the idle transmission capacity.

BRIEF DESCRIPTION OF THE DRAWINGS

The foregoing objects, features and advantages of the invention will be more apparent from the following detailed description in reference to the appended drawings, wherein.

DETAILED DESCRIPTION OF THE PREFERRED EMBODIMENT

Hereinafter, embodiments of the invention will be described in detail in reference to the appended drawings.

For easier understanding of the constitution and operation of the invention, a communication system according to embodiments of the invention will be assumed to provide both of a variable transmission rate service and a data transmission service using the idle capacity. The variable transmission rate service determines transmission the QoS including the minimum transmission rate which is guaranteed in any case and the maximum transmission rate in session setting same as current services. The data transmission service utilizing idle capacity cannot be guaranteed with any transmission QoS and are allowed for data transmission within the value determined by the system only in the case that some of the capacity which is allocated to the service is unused.

Also in this embodiment, both services exist at the same time, namely, the variable transmission rate service such as IMT(International Mobile Telecommunication)-2000 which is allocated with a dedicated transmission capacity and another service for transmitting data by using a shared capacity based upon information broadcasted from a sending side of the system, in which it is illustrated that if there is some extra capacity which is not yet used in the variable transmission rate service, this capacity is used for a shared capacity utilization transmission based upon a dynamic random access process.

In this embodiment, even if the capacity corresponding to the sum of the minimum transmission rates of the variable transmission rate service sessions is not being used, the capacity is not used for the data transmission service using the idle capacity. However, the transmission rate variation of the variable transmission rate service sessions which perform the transmission in the transmission rate between the minimum and maximum transmission rates is controlled so that the unused idle capacity of the system can be forecasted, thereby enabling this idle capacity to be used for the data transmission. Therefore, in using the variable transmission rate service, the minimum transmission rate is always guaranteed available.

In the invention, the transmission rate between the minimum and maximum transmission rates in the variable transmission rate service sessions is defined as controllable transmission rate. The degree of change of the controllable transmission rate is controlled so that the capacity used for the data transmission can be forecasted. When the sum of the minimum transmission rates of the variable transmission rate service increases due to the start of a new service session for example, the transmission rates of all sessions using the idle capacity are decreased in the same ratio by using the allowable transmission rate value so that the system is not exceeded in capacity. On the other hand, when the sum of the minimum transmission rates according to session decreases due to termination of the data service session, etc., the transmission rates of all sessions using the idle capacity are increased so that the idle capacity can be utilized in the maximum amount.

In order to provide better service quality to users of the variable transmission rate service, the controllable transmission rate is preferably controlled so that the control transmission rate is increased rapidly when the data traffic of the user session increases, and is decreased slowly when the transmission data traffic decreases. On the other hand, in order to maximize the capacity of the system, it is preferred that the control transmission rate should be increased less rapidly when the traffic increases, and be decreased more rapidly when the transmission data traffic decreases. The control transmission rate can be controlled simply by changing a method of determining the control transmission rate.

In the embodiments of the invention, the control of this controllable transmission rate is based upon unit time corresponding to a predetermined time period, and performed on the basis of the average movement value and standard movement deviation of the data traffic of each session which uses the variable transmission rate service measured in the receiving side. The average movement $M_i(t)$ of the transmission data traffic in unit time t about the variable transmission rate service session i is obtained from the following equation 1:

$$M_i(t) = \frac{1}{W} \sum_{u=1}^{W} r_i(u),$$ equation 1 herein, $r_i(u)$ means traffic amount during the unit time u, and W means number of the unit times for obtaining the average movement.

Also, the standard movement deviation $\sigma_i(t)$ of the transmission traffic of the session i is obtained from the following equation 2:

$$\sigma_i(t) = \sqrt{\frac{1}{W} \sum_{u=1}^{W} (r_i(u) - M_i(t))^2}.$$ equation 2

Also, the forecasted traffic value $R_i^P(t+1)$ in unit time t+1 about the variable transmission rate service session of the invention is obtained from the following equation 3:

$$R_i^P(t+1) = M_i(t) + \alpha(\sigma_i(t))^\beta + \gamma.$$ equation 3

In the equation 3, each of $\alpha$, $\beta$ and $\gamma$ is a variable and can be designated as a constant or a series of equation which is not a constant.

In the foregoing equations, values of W, $\alpha$, $\beta$ and $\gamma$ can be controlled to obtain gradient features about the desired controllable transmission rate. By decreasing the value of W, the allowable transmission rate can be activated to the traffic more sensitively, and by increasing $\alpha$, $\beta$ and $\gamma$, the variable transmission rate service session can be provided with better service quality.

Also, in the system where a number of users transmit data at the same time, the control transmission rate $R_i^C(t+1)$ about the variable transmission rate service session i is calculated from the following equation 4:

$$R_i^C(t+1) = \min[\max[R_i^P(t+1), R_i^S], R_i^M],$$ equation 4 herein, $R_i^S$ is the minimum transmission rate of the session i, and $R_i^M$ is the maximum transmission rate of the session i.

The transmission rate of each of the service sessions is restricted by the control transmission rate calculated by the foregoing equation 4, so that the maximum value of the system transmission capacity which will be used by the variable transmission rate service in the next unit time can be calculated and the available idle transmission capacity can be determined by using this method. The allowable transmission rate Q(t+1) of the service sessions using the idle capacity in the unit time t+1 is determined from the following equation 5:

$$Q(t+1) = C - \sum_{j=1}^{N} R_j^C(t+1),\qquad \text{equation 5}$$

herein, N is the number of the currently variable transmission rate service sessions of the system.

Therefore, on the basis of this value, the channel transmission rates of the random access channels(RACH) and number of each transmission rate available in the time t+1, and information and diffusion codes corresponding to these channels are transmitted before the time t+1, so that the data can be transmitted by using the capacity which is not used by the variable transmission rate service.

Figure 1:
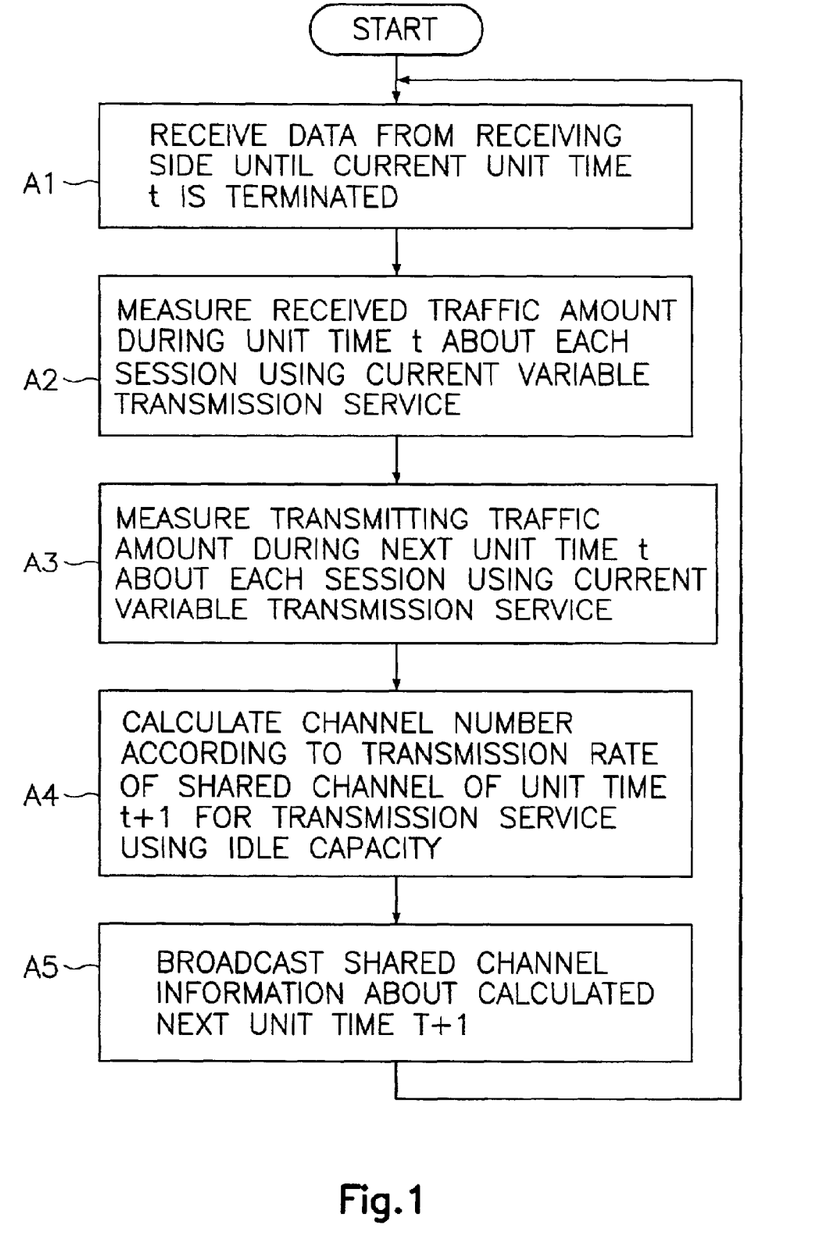
FIG. 1 is a flow chart for showing a process in which a receiving communication system executes a method for adaptive data transmission according to the invention.

Meanwhile, the control process of the unit time t in the receiving communication system for providing the data transmission method according to the invention based upon the foregoing theory is described in reference to FIG. 1. In step A1, the data is received from the sending communication system until the current unit time t ends, and in step A2, when the current unit time t ends, the amount of the data received during the unit time is measured according to the session using the variable transmission rate service.

In step A3, the transmission rates transmittable during the next unit time are forecasted according to each of the variable transmission rate service sessions from the result calculated according to the equations 1 to 4. In step A4, the transmission rates of the dedicated channels according to the channel and number of the channels according to the transmission rate are calculated in the next unit time for the transmission service using the idle capacity based upon the result forecasted in the step A3. In step A5, channel sharing information about the next unit time calculated in the step A4 is broadcasted and transmitted to the sending communication systems.

Figure 2:
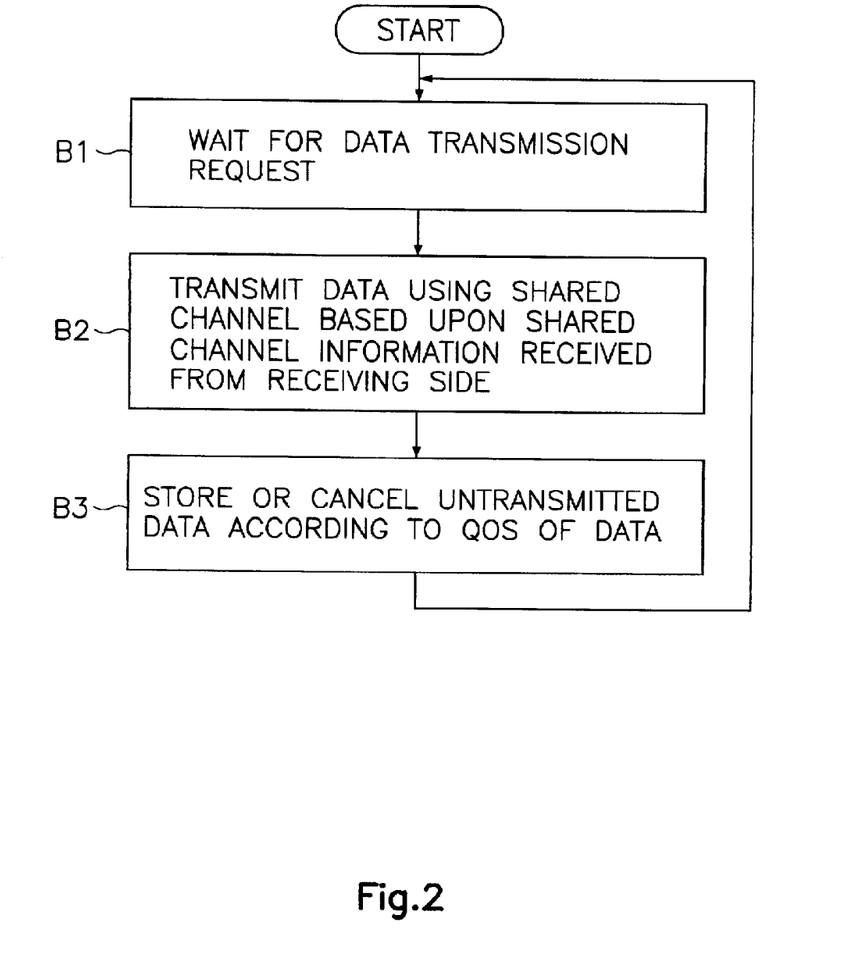
FIG. 2 is a flow chart for showing a process in a sending communication system in which an idle capacity utilizing service is applied according to the invention.

Now, a process of controlling the unit time t in the sending communication system in which the idle capacity utilization service is applied to provide the data transmission method according to the invention will be described in reference to FIG. 2. In step B1, the system waits for a data transmission request from the user, and in step B1, when the data transmission request is confirmed, the system transmits data according to available shared channel information of the current unit time t, which is received from the receiving communication system.

Then, some data which were not transmitted in the step C2 are stored in a transmission queue in the sending communication system or canceled according to the corresponding QoS in step B3. Here, the sending communication system receives the allowable transmission rate of the next unit time from the receiving communication system in the termination point of each unit time, and applies the same to the data transmission in the step B2.

Figure 3:
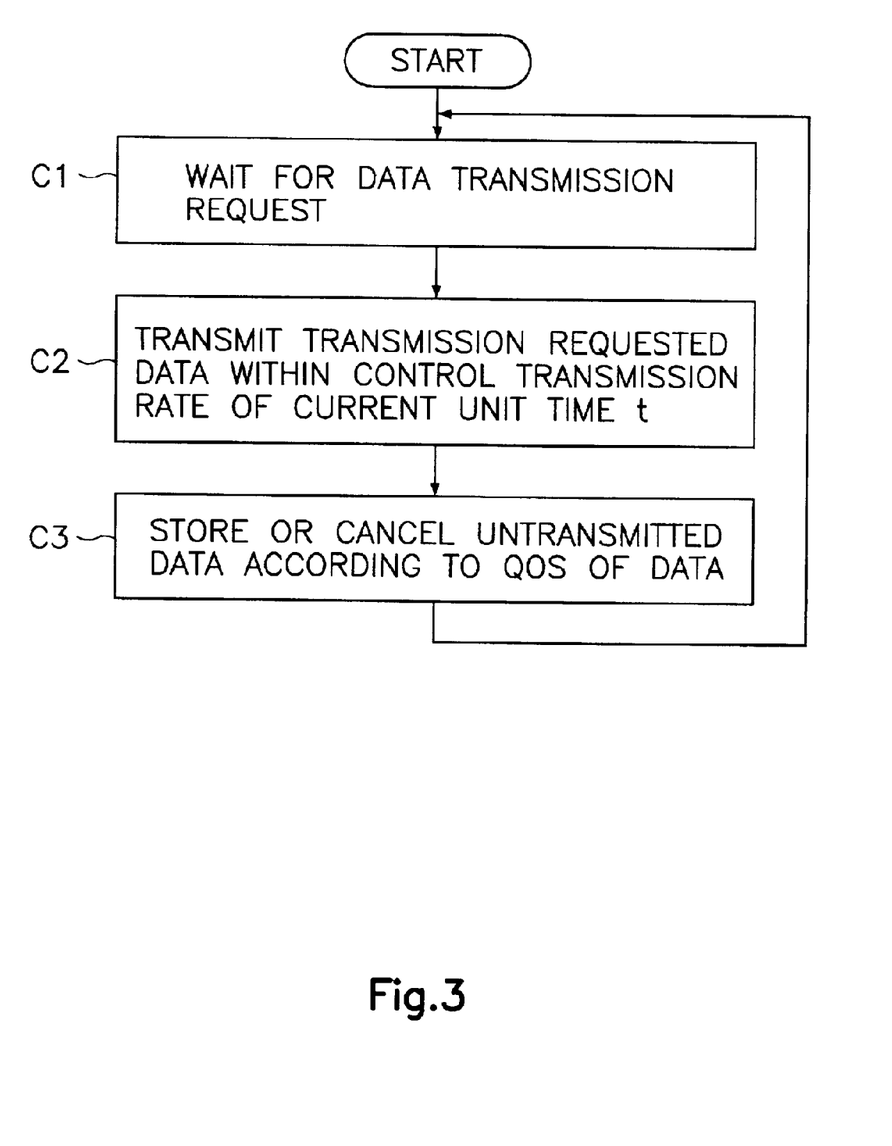
FIG. 3 is a flow chart for showing a process in a sending communication system in which a variable transmission rate service is applied according to the invention.

Now, a process of controlling the unit time t in the sending communication system for providing the data transmission method according to the invention, in which a variable transmission rate service is applied, will be described in reference to FIG. 3.

In step C1, the sending communication system waits for a data transmission request from the user, and in step C2, when the data transmission request is confirmed, transmits data within the control transmission rate of the current unit time t, which is calculated in the sending communication system according to the equations 1 to 4.

Then, some data, which were not transmitted in the step B2, are stored in the transmission queue in the sending communication system or canceled according to the corresponding QoS in step C3. Here, the control transmission rate calculated by the sending communication system in the step C2 should be same as the method used for forecasting the data traffic in the step A3 in the flow chart of the sending side embodiment shown in FIG. 1, and the same result value should be calculated.

The data such as voice conversation information or image conversation information which are sensitive to transmission lag and allow a certain degree of data loss should be canceled when transmission has been delayed at least a predetermined time period. On the other hand, the data such as internet communication data which are less sensitive to the lag but disallow data loss should be stored in the queue until transmitted.

Examples of shared channel information and data transmission between the sending communication system and receiving communication system of the sessions which use the foregoing transmission services utilizing the idle capacity will be described in reference to FIG. 4.

Figure 4:
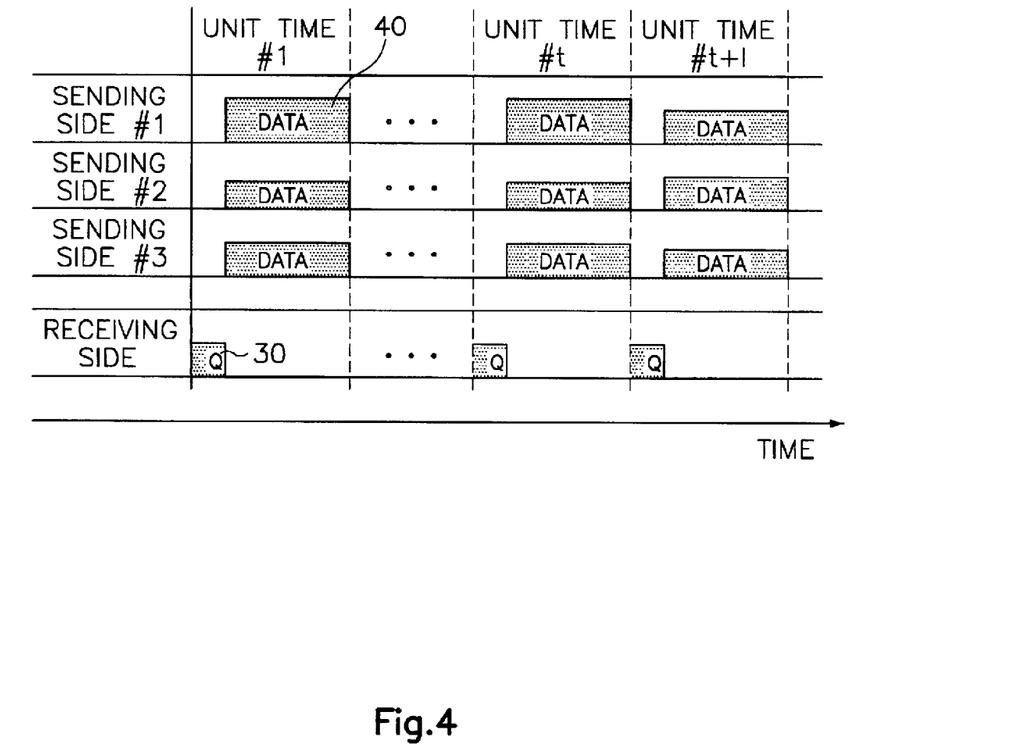
FIG. 4 shows an example of data transmission between sending communication systems and receiving communication systems according to the invention.

As shown in FIG. 4, the data transmission control about the service sessions utilizing the idle capacity is carried out according to the unit time, and the unit time is started by the shared channel transmission from the receiving communication system in FIG. 4. The receiving communication system calculates the allowable transmission rate during the unit time using the shared channel based upon the transmission rates of the variable transmission rate service sessions transmitted via the dedicated channels which were received in the previous unit, and transmits corresponding diffusion codes which determine channel number according to the transmission rate of the shared channels to the sending communication systems. These shared channel information is indicated as Q 30 in FIG. 4. Based upon the shared channel information, the sending systems using each of the idle capacity utilization services transmit the data 40. In the embodiments of the invention, the shared channel information can be used by all of the sending sides which participate in the communication, so the information is sufficient to be broadcasted from the receiving communication system to all of the sending communication systems.

For reference, the example of FIG. 4 describes the basic method for illustration only. In the actual operation, the allowable transmission rate calculation and the resultant shared channel information are performed during a portion of the leading part of the unit time t−1, so the terminal side which uses the shared channel information to transmit the data can continuously transmit the data without waiting for the shared channel information from a base station.

Now, a control flow and data flow of the sending and receiving side communication systems for providing the data transmission method of the invention will be described in reference to FIG. 5, in which cases are discriminated for using the idle capacity utilization transmission service and for using the variable transmission rate service.

Figure 5:
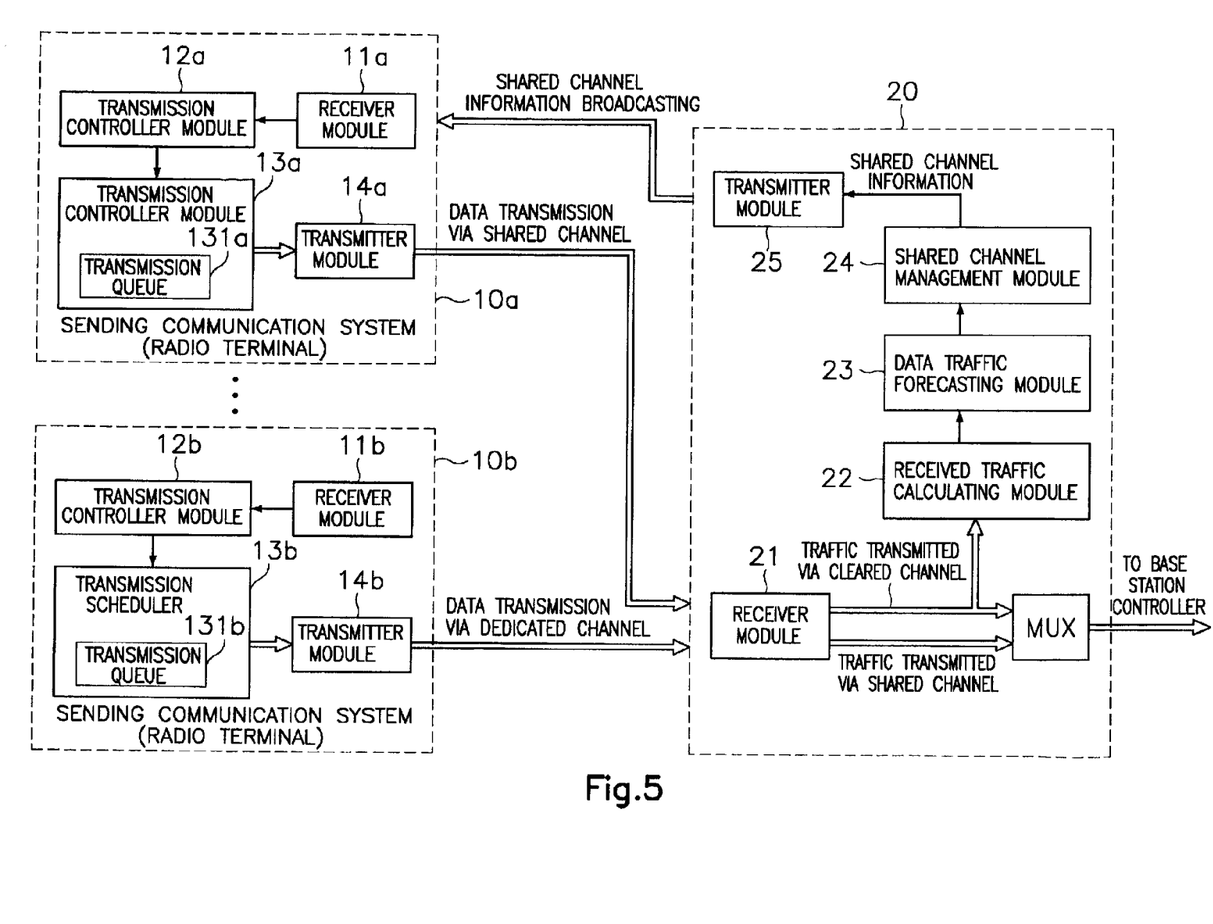
FIG. 5 is a block diagram for showing the constitution of a communication system for adaptive data transmission according to the invention.

As shown in FIG. 5, the sending communication systems 10a and 10b for providing the data transmission method of the invention comprise receiver modules 11a and 11b, transmission controller modules 12a and 12b, transmission scheduler modules 13a and 13b having transmission queues 131a and 131b, and transmitter modules 14a and 14b. The receiving communication system 20 comprises a receiver module 21, a received traffic calculating module 22, a data traffic forecasting module 23, a shared channel management module 24 and a transmitter module 25.

Here, the idle capacity utilization transmission system is used by the sending communication system 10a shown in the upper part of FIG. 5, which transmits data by using the shared channel information transmitted from the receiving communication system 20 or the unused portion from the capacity allocated to the dedicated channel. The receiver module 11a receives the channel information transmitted from the receiving transmission system 20, and the transmission controller module 12a controls the transmission scheduler module 13a based upon the received shared channel information.

The transmission scheduler module 13a stores transmitting data in the transmission queue 131a when data transmission is requested from the user, and sends the data to the transmitter module 14a in response to a control signal of the transmission controller module 12a. The transmitter module 14a modulates the data received from the transmission scheduler module 13a, diffuses the data into a value corresponding to the pertinent shared channel subjected to transmission, and transmits the diffused data to the receiving communication system.

Also, the variable transmission rate service is used by the sending communication system 10b shown in the lower part of FIG. 5, which transmits data by using the allowable capacity allocated to the dedicated channel. The receiver module 11b receives a confirmation signal for example about the session setting and the QoS. The transmission controller module 12b independently calculates the control transmission rate which can be transmitted during the next unit time according to each of the equations 1 to 4 based upon the amount of the data transmitted during the unit time, and accordingly controls the data transmission from the transmission scheduler module 13b.

Here, in order to have the same result as that of the data traffic forecasting according to the variable transmission service session which be transmitted during the next unit time in the data traffic forecasting module 23 of the receiving communication system 20, the control transmission rate of the next unit time calculated in the transmission controller module 12b should be obtained according to the same method.

The transmission scheduler module 13b stores the transmitting data in the transmission queue upon data transmission request from the user, and sends the data to the transmitter module 14b in response to a control signal from the transmission controller module 12b. The transmitter module 14b modulates and then transmits the data received from the transmission scheduler module 13b to the receiving communication system via a shared transmission medium.

Meanwhile, when the idle capacity utilization service or the variable transmission rate service is used to provide the data transmission method of the invention, the receiver module 21 of the receiving communication system 20 receives the data transmitted from one sending transmission system using the variable transmission rate service and the other sending transmission system using the idle capacity utilization service, the received traffic calculating module 22 calculates the traffic received during the unit time only about each of the variable transmission rate service sessions of the data received in each unit time.

The data traffic forecasting module 23 forecasts the amount of the data traffic in the next unit time and a resultant transmission rate thereof based upon the value calculated in the received traffic calculating module 22 via the calculation according to each of the equations 1 to 4. Here, in order to have the same result as that of the control transmission rate value calculated in the transmission controller module 12b of the sending communication system 10b when using the variable transmission rate service is used, the data traffic value in the data traffic forecasting module 23 should be obtained according to the same method.

Then, the shared channel module 24 calculates the allowable transmission rates about the idle capacity utilization service sessions in the next unit time based upon the forecasted data traffic values about the services in the data traffic forecasting module 23 via an allowable transmission rate calculator module (not shown) therein according to the equation 5. The transmitter module 25 transmits the allowable transmission rate calculated in the allowable transmission calculator module 24 to the sending communication system 10a which uses the idle capacity utilization transmission service.

As a result, the users and application programs of the variable transmission rate data services exchange same QoS(Quality of Service) parameters with the network in the same way to set sessions for using the same and are little restricted in use, which conforms to the definition of the variable transmission rate services of the current ATM and other standard drafts.

Therefore, the current users or applications using the variable transmission rate services are not influenced at all. The idle capacity can be forecasted via the transmission restriction of the variable transmission rate data so that the data transmission can be realized by using the idle capacity.

The foregoing embodiments can be obtained in the typical data communication system, and in particular usefully applied to radio communication systems such as CDMA systems which are restricted in capacity via mutual interference.

Furthermore, in a spread-spectrum CDMA system, all of the users share the frequency, the multiple access method is provided by transmission power, and orthogonal codes which are different with each other discriminate each user. In this system, signals from other users within the same frequency are considered as noise. Therefore, if the system users do not use all of the allocated power space, an idle power space is generated. The transmission service utilizing such an idle capacity can be used according to the foregoing method. Generally in the CDMA systems, transmission power should be proportional to the transmission rate in order to provide same error rate, so the transmission rates of the idle capacity utilization service sessions are preferably controlled together with the transmission power when the invention is applied. Here, the transmission rate control can be performed same as in the foregoing embodiments, and the power control may be performed in the same proportion as the transmission rate control at the same time.

As described in detail hereinbefore, according to the invention, the transmission rate variation rates of each of the variable transmission rate data transmission services are controlled so that the data traffic of the existing variable transmission rate transmission services which is actually unable to be forecasted can be forecasted. Therefore, the available idle transmission capacity can be forecasted so that the data can be transmitted by using the idle capacity. Also, the transmission capacity of the system can be efficiently used.

What is claimed is:

1. A method for adaptive data transmission in a communication system which has a plurality of sending communicaiton means and receiving communication means using a shared channel and a dedicated channel, said method comprising the steps of:

(a1) receiving in the receiving communication means data transmitted from the pluarlity of sending communicaiton means using the dedicate channel;

(b1) when the data are received, obtaining an idle capacity which is not being used from the maximum transmission capacity which is already allocated to the plurality of sending communication means using the dedicated channel; and (c1) when the idle capacity is obtained, broadcasting shared channel information about the idle capacity to the plurality of sending communication means which use the shared channel, and later transmitting in the sending communication means the data according to the shared channel information, whereby when the plurality of sending communication means transmit the data by using the dedicated channel via variable transmission rate services, the variation rate of the transmission rates of the variable transmission rate data transmission services transmitted from the sending communicaiton means is controlled so that the idle transmission capacity can be forecasted for use in other service data transmission, wherein said step of (a1) receiving in one of the receiving communicaiotn means, when the plurality of sending communication means using the dedicated channel transmits the data via the variable transmission rate service, has the steps of:

(a2) calculating the average movement value and standard movement deviation value of transmission data traffic according to unit time r about variable transmission rate service session subjected to transmission, in response to a data transmission request of a user;

(b2) forecasting the traffic in the next unit time r+1 by using the calculated average movement value and standard movement deviation value;

(c2) obtaining a control transmission rate via the forecasted data traffic, wherein the control transmission rate guarantees a transmission rate between the minimum transmission rate and the maximum transmission rate; and (d2) transmitting the data within the obtained control transmission rate.

2. The method for adaptive data transmission according to claim 1, wherein said step (b2) of forecasting traffic uses the following equation:

$$R_i^P(t+1)=M_i(t)+\alpha(\sigma_i(t))^\beta+\gamma,$$

wherein, $R_i^P(t+1)$ is the forecasted traffic value,
$M_i(t)$ is the average movement value,
$\sigma_i(t)$ is the standard movement deviation value, and
$\alpha$, $\beta$ and $\gamma$ mean a variable, respectively.

3. The method for adaptive data transmission according to claim 1, wherein said step (c2) of obtaining control transmission rate uses the following equation:

$$R_i^C(t+1)=\min[\max[R_i^P(t+1), R_i^S], R_i^M],$$

wherein, $R_i^C(t+1)$ is the control transmission rate,
$R_i^P(t+1)$ is the forecasted traffic value,
$R_i^S$ is the minimum transmission rate of session i, and
$R_i^M$ is the maximum transmission rate of session i.

4. The method for adaptive data transmission according to claim 1, wherein said step (d2) of transmitting the data, if some of the data are not transmitted at present, has the step of storing the data in a transmission queue or canceling the same according to corresponding QoS.

5. The method for adaptive data transmission according to claim 1, wherein said step (b1) of obtaining an idle capacity has the steps of:

(a3) forecasting the traffic of the data received from the sending communication means using the dedicated channel;

(b3) obtaining a control transmission rate via the forecasted data traffic, wherein the control transmission rate is between the minimum transmission rate and the maximum transmission rate; and (d3) obtaining an idle allowable transmission rate which is not being used from the maximum capacity allowed to the plurality of sending side by using the control transmission rate.

6. The method for adaptive data transmission according to claim 5, wherein said step (a3) of obtaining a control transmission rate has the steps of:

measuring the amount of the data received during unit time according to the session using the variable transmission rate service, when the data is received during unit time t; and forecasting the traffic value of the next unit time t+1 about the variable transmission rate service session based upon the measured amount of the data.

7. The method for adaptive data transmission according to claim 6, wherein said step (a3) of measuring the amount of the data has the steps of:

calculating the average movement of the transmission data traffic of the unit time t about the variable transmission rate service; and obtaining the standard movement deviation about the average movement value.

8. The method for adaptive data transmission according to claim 6, wherein said step of forecasting the traffic value uses the equation:

$$R_i^P(t+1)=M_i(t)+\alpha(\sigma_i(t))^\beta+\gamma,$$

wherein, $R_i^P(t+1)$ is the forecasted traffic value,
$M_i(t)$ is the average movement value,
$\sigma_i(t)$ is the standard movement deviation value, and
$\alpha$, $\beta$ and $\gamma$ mean a variable, respectively.

9. The method for adaptive data transmission according to claim 5, wherein said step (b3) of obtaining the control transmission rate uses the equation:

$$R_i^C(t+1)=\min[\max[R_i^P(t+1), R_i^S], R_i^M],$$

wherein, $R_i^C(t+1)$ is the control transmission rate,
$R_i^P(t+1)$ is the forecasted traffic value,
$R_i^S$ is the minimum transmission rate of session i, and
$R_i^M$ is the maximum transmission rate of session i.

10. A method for adaptive data transmission according to claim 5, wherein said step (c3) of obtaining an unused idle allowable transmission rate uses the equation:

$$Q(t+1) = C - \sum_{j=1}^{N} R_j^C(t+1),$$

wherein Q(t+1) is the idle allowable transmission rate,
C is the maximum capacity allowed to the sending side,
N is number of the current variable transmission rate sessions, and
$R_j^C(t+1)$ is the control transmission rate.

11. A method for adaptive data transmission according to claim 1, wherein the shared channel information transmitted in said step (c1) of broadcasting and transmitting includes transmission rates according to the channel and number of channels according to the transmission rate of the shared channel.

12. The method for adaptive data transmission according to claim 1, wherein the transmitting the data in the sending communication means in said step (c1) of broadcasting and transmitting has the steps:
- (a4) transmitting data according to the available shared channel information of the current unit time t received from the receiving communication means in response to the data transmission request of the user; and
- (b4) storing some data which were not transmitted in said step (b1) of transmitting data to a transmission queue in the sending communication system or canceling the same according to corresponding QoS;
- wherein the allowable transmission rate of the next unit time is received from the receiving communication system in the termination point of each unit time in said step (a1).

13. A method for adaptive data transmission in a plurality of sending communication means, in a communication system which has the sending communication means and receiving communication means using a shared channel and a dedicated channel, said method comprising the steps of:
- (a5) calculating the average movement and the standard movement deviation of a transmission data traffic per unit time t about variable transmission rate service session to be transmitted, in response to a data transmission request of a user;
- (b5) forecasting the traffic in the next unit time t+1 by using the calculated average movement value and the standard movement deviation value;
- (c5) obtaining a control transmission rate guaranteeing a value between the minimum and maximum transmission rates via the calculated data traffic; and
- (d5) transmitting data within the obtained control transmission rate;
- whereby when the plurality of sending communication means transmit the data via variable transmission rate services by using the dedicated channel, the variation rate of the transmission rates of variable transmission rate data transmission services is controlled so that the receiving communication means can forecast the idle transmission capacity.

14. The method for adaptive data transmission in a plurality of sending communication means according to claim 13, wherein said step (b5) of forecasting the traffic uses the equation:

$$R_i^P(t+1)=M_i(t)+\alpha(\sigma_i(t))^\beta+\gamma,$$

wherein, $R_i^P(t+1)$ is the forecasted traffic value,
$M_i(t)$ is the average movement value,
$\sigma_i(t)$ is the standard movement deviation value, and
$\alpha$, $\beta$ and $\gamma$ mean a variable, respectively.

15. The method for adaptive data transmission in a plurality of sending communication means according to claim 13, wherein said step (c5) of obtaining a control transmission rate uses the equation:

$$R_i^C(t+1)=\min[\max[R_i^P(t+1), R_i^S], R_i^M],$$

wherein, $R_i^C(t+1)$ is the control transmission rate,
$R_i^P(t+1)$ is the forecasted traffic value,
$R_i^S$ is the minimum transmission rate of session i, and
$R_i^M$ is the maximum transmission rate of session i.

16. A method for adaptive data transmission in a plurality of sending communication means according to claim 13, wherein said step (d5) of transmitting data, if some of the data are not transmitted at present, has the step of storing the data in a transmission queue or canceling the same according to corresponding QoS.

17. A method for adaptive data transmission in receiving communication means in a communication system which has a plurality of sending communication means and receiving communication means using a shared channel and a dedicated channel, said method comprising the steps of:
- (a6) forecasting the traffic of data received from the sending communication means using the dedicated channel;
- (b6) obtaining a control transmission rate guaranteeing a value between the minimum and maximum transmission rates via the forecasted data traffic;
- (c6) obtaining an idle allowable transmission rate which is not being used from the maximum capacity allowed to the plurality of sending side by using the obtained control transmission rate; and
- (d6) when the idle capacity is obtained, broadcasting shared channel information about the idle capacity to the plurality of sending communication means which use the shared channel, and later transmitting in the sending communication means the data according to the shared channel information,
- whereby when the plurality of sending communication means transmit the data via the dedicated channel via variable transmission rate services, the idle transmission capacity which is not being used in the maximum capacity already allocated to the dedicated channel of the sending communication means can be forecasted for use in transmitting other service data.

18. The method for adaptive data transmission in receiving communication means according to claim 17, wherein said step (a6) of obtaining a control transmission rate has the steps of:
- (a7) measuring the amount of the data received during unit time according to the session using the variable transmission rate service, when the data is received during unit time t; and
- (b7) forecasting the traffic value of the next unit time t+1 about the variable transmission rate service session based upon the measured amount of the data.

19. The method for adaptive data transmission in receiving communication means according to claim 18, wherein said step (a7) of measuring the amount of the data has the steps of:
- calculating the average movement of the transmission data traffic of the unit time t about the variable transmission rate service; and
- obtaining the standard movement deviation about the average movement value.

20. The method for adaptive data transmission in receiving communication means according to claim 18, wherein said step (b7) of forecasting the traffic value uses the equation:

$$R_i^P(t+1)=M_i(t)+\alpha(\sigma_i(t))^\beta+\gamma,$$

wherein, $R_i^P(t+1)$ is the forecasted traffic value,
$M_i(t)$ is the average movement value,
$\sigma_i(t)$ is the standard movement deviation value, and
$\alpha$, $\beta$ and $\gamma$ mean a variable, respectively.

21. The method for adaptive data transmission in receiving communication means according to claim 17, wherein said step (b6) of obtaining a control transmission rate uses the the equation:

$$R_i^C(t+1)=\min[\max[R_i^P(t+1), R_i^S], R_i^M],$$

wherein, $R_i^C(t+1)$ is the control transmission rate,
$R_i^P(t+1)$ is the forecasted traffic value,
$R_i^S$ is the minimum transmission rate of session i, and
$R_i^M$ is the maximum transmission rate of session i.

22. The method for adaptive data transmission in receiving communication means according to claim 17, wherein said step (c6) of obtaining an idle allowable transmission rate uses the equation:

$$Q(t+1) = C - \sum_{j=1}^{N} R_j^C(t+1),$$

wherein $Q(t+1)$ is the idle allowable transmission rate,
C is the maximum capacity allowed to the sending side,
N is number of the current variable transmission rate sessions, and
$R_j^C(t+1)$ is the control transmission rate.

23. The method for adaptive data transmission in receiving communication means according to claim 17, wherein the shared channel information transmitted in said step (c6) of broadcasting and transmitting includes transmission rates according to the channel and number of channels according to the transmission rate of the shared channel.

24. An apparatus for adaptive data receiving in a communication system having a plurality of sending communication means and receiving communication means which use a shared channel and a dedicated channel, said apparatus comprising:
  a receiver module for receiving data per unit time t, the data being transmitted from one sending communication means using a variable transmission rate service via the dedicated channel and the other sending communication means using an idle capacity utilization service via the shared channel;
  a received traffic calculating module for calculating a traffic received during the unit time only about each of variation transmission service sessions of the data received per unit time;
  a data traffic forecasting module for calculating and forecasting the amount of data traffic in the next unit time based upon the value calculated in the received traffic calculation module about the each of the variable transmission rate service sessions, and obtaining a control transmission rate which guaranteeing a value between the minimum and maximum transmission rates via the calculated forecasting data traffic;
  a shared channel module for calculating an idle allowable transmission rate about idle capacity utilization service sessions of the unit time based upon the control transmission rate value about the services in said data traffic forecasting module; and
  a transmitter module for transmitting the allowable transmission rate to the sending communication means using the idle capacity utilization transmission service via the shared channel,
  whereby when the plurality of sending communication means transmit the data by using the dedicated channel via variable transmission rate services, the idle transmission capacity which is not being used in the maximum capacity already allocated to the dedicated channel of the sending communication means can be forecasted for use in other service data transmission.

25. The apparatus for adaptive data receiving in a communication system according to claim 24, wherein said received traffic calculating module calculates the received traffic by calculating the average movement of the transmission data traffic of the unit time t about the variable transmission rate service, and then obtaining the standard movement deviation about the average movement value.

26. The apparatus for adaptive data receiving in a communication system according to claim 24, wherein said data traffic forecasting module forecasts the traffic from the equation:

$$R_i^P(t+1) = M_i(t) + \alpha(\sigma_i(t))^\beta + \gamma,$$

wherein, $R_i^P(t+1)$ is the forecasted traffic value,
$M_i(t)$ is the average movement value,
$\sigma_i(t)$ is the standard movement deviation value, and
$\alpha$, $\beta$ and $\gamma$ mean a variable, respectively.

27. The apparatus for adaptive data receiving in a communication system according to claim 24, wherein said data traffic forecasting module obtains the control transmission rate from the equation:

$$R_i^C(t+1) = \min[\max[R_i^P(t+1), R_i^S], R_i^M],$$

wherein, $R_i^C(t+1)$ is the control transmission rate,
$R_i^P(t+1)$ is the forecasted traffic value,
$R_i^S$ is the minimum transmission rate of session i, and
$R_i^M$ is the maximum transmission rate of session i.

28. The apparatus for adaptive data receiving in a communication system according to claim 24, wherein said shared channel module calculates the idle allowable transmission rate from the equation:

$$Q(t+1) = C - \sum_{j=1}^{N} R_j^C(t+1),$$

wherein $Q(t+1)$ is the idle allowable transmission rate,
C is the maximum capacity allowed to the sending side,
N is number of the current variable transmission rate sessions, and
$R_i^C(t+1)$ is the control transmission rate.

29. An apparatus for adaptive data transmission in a communication system having sending communication means and receiving communication means which use a shared channel and a dedicated channel, said apparatus comprising:
  a receiver module for receiving shared channel information transmitted from the receiving communication means;
  a transmission controller module for controlling a transmission scheduler module based upon the shared channel information received from the receiving communication means;
  a transmission scheduler module for storing transmitting data in a transmission queue according to a data transmission request from a user, and sending the data to a transmitter module in response to a control signal from said transmission controller module; and
  a transmission module for modulating the data received from said transmission scheduler module, diffusing the data into a value corresponding to the pertinent shared channel subjected to transmission, and transmitting the diffused data to the receiving communication system,
  whereby an idle transmission capacity which is not being used from the maximum allocation capacity already allocated to the sending communication means using the dedicated channel can be used to transit the data by using the shared channel information transmitted from the receiving communication means.

30. The apparatus for adaptive data transmission in a communication system having a plurality of sending communication means and receiving communication means which use a shared channel and a dedicated channel, said apparatus comprising:
- a receiver module for receiving a confirmation signal about a variable transmission rate service session setting and a QoS request;
- a transmission controller module for calculating the amount of a transmittable data traffic during the next unit time and forecasting the data traffic thereof based upon the amount of data transmitted during unit time, calculating a control transmission rate which guarantees a value between the minimum and maximum rates via the calculated forecasting data traffic, and then controlling data transmission from a transmission scheduler module according to the control transmission rate;
- a transmission scheduler module for storing transmitting data in a transmission queue according to a data transmission request from a user, and sending the data to a transmitter module in response to a control signal from said transmission controller module; and
- a transmitter module for modulating the data received from said transmission scheduler module and transmitting the modulated data to the receiving communication system via the corresponding dedicated channel,
- whereby when the plurality of sending communication means transmit the data via variable transmission rate services by using the dedicated channel, the variation rate of the transmission rates of variable transmission rate data transmission services is controlled so that the receiving communication means can forecast the idle transmission capacity.

31. The apparatus for adaptive data transmission in a communication system according to claim 30, wherein said transmission controller module calculates the transmittable traffic by calculating the average movement of the transmission data traffic of the unit time t about the variable transmission rate service, and then obtaining the standard movement deviation about the average movement value.

32. The apparatus for adaptive data transmission in a communication system according to claim 30, wherein said transmission controller module uses the following equation when forecasting the transmittable data traffic during the next unit time according to the calculated amount of the traffic:

$$R_i^P(t+1) = M_i(t) + \alpha(\sigma_i(t))^\beta + \gamma,$$

wherein, $R_i^P(t+1)$ is the forecasted traffic value,
$M_i(t)$ is the average movement value,
$\sigma_i(t)$ is the standard movement deviation value, and
$\alpha$, $\beta$ and $\gamma$ mean a variable, respectively.

33. The apparatus for adaptive data transmission in a communication system according to claim 30, wherein said transmission controller module calculates the control transmission rate from the following equation:

$$R_i^C(t+1) = \min[\max[R_i^P(t+1), R_i^S], R_i^M],$$

wherein, $R_i^C(t+1)$ is the control transmission rate,
$R_i^P(t+1)$ is the forecasted traffic value,
$R_i^S$ is the minimum transmission rate of session i, and
$R_i^M$ is the maximum transmission rate of session i.

* * * * *